United States Patent
Nam (10) Patent No.: US 9,141,883 B1
(45) Date of Patent: Sep. 22, 2015

(54) METHOD, HARD NEGATIVE PROPOSER, AND CLASSIFIER FOR SUPPORTING TO COLLECT HARD NEGATIVE IMAGES USING A SIMILARITY MAP

(71) Applicant: StradVision, Inc., San Jose, CA (US)

(72) Inventor: Woonhyun Nam, Gyeongbuk (KR)

(73) Assignee: StradVision, Inc., San Jose, CA (US)

( * ) Notice: Subject to any disclaimer, the term of this patent is extended or adjusted under 35 U.S.C. 154(b) by 0 days.

(21) Appl. No.: 14/708,669

(22) Filed: May 11, 2015

(51) Int. Cl.
  *G06F 15/18* (2006.01)
  *G06K 9/62* (2006.01)
  *G06F 17/30* (2006.01)

(52) U.S. Cl.
  CPC ........ *G06K 9/6256* (2013.01); *G06F 17/30247* (2013.01); *G06K 9/627* (2013.01); *G06K 9/628* (2013.01); *G06K 9/6227* (2013.01)

(58) Field of Classification Search
  CPC ................. G06F 17/30247; G06F 17/30598; G06K 9/00147; G06K 9/4671
  USPC ..................................... 706/12, 45
  See application file for complete search history.

(56) References Cited

U.S. PATENT DOCUMENTS

| 9,076,056 | B2* | 7/2015 | Wang et al. ........................... 1/1 |
| 2006/0034484 | A1* | 2/2006 | Bahlmann et al. ............ 382/103 |
| 2008/0063285 | A1* | 3/2008 | Porikli et al. ................ 382/190 |
| 2008/0208072 | A1* | 8/2008 | Fadem et al. ................. 600/544 |
| 2012/0134582 | A1* | 5/2012 | Treado et al. ................ 382/165 |

* cited by examiner

*Primary Examiner* — David Vincent
(74) *Attorney, Agent, or Firm* — Husch Blackwell LLP (57) ABSTRACT

A method for supporting to collect hard negative image is provided. The method includes the steps of: (a) a classifier receiving from a hard negative proposer, and classifying, hard negative image candidate corresponding to a certain label candidate or a specific label candidate judged to have semantic or visual relationship with a target object; and (b) the classifier (i) allowing the hard negative proposer to select an additional label candidate whose similarity to the certain label candidate or the specific label candidate exceeds a preset degree of similarity, if a percentage or a number of the hard negative image candidate mistaken for having the target object is judged to satisfy a prefixed condition, (ii) receiving at least one additional hard negative image candidate corresponding to the selected additional label candidate and (iii) classifying the additional hard negative image candidate.

28 Claims, 8 Drawing Sheets

POSTIVE
IMAGE SAMPLES

FIG. 2B

NEGATIVE IMAGE SAMPLES

FIG. 2C

HARD NEGATIVE
IMAGE SAMPLES

A SHORT <u>VERTICAL POST</u> A VARIETY OF STRUCTURES TO CONTROL OR DIRECT ROAD TRAFFIC.
SHORT, <u>POST</u>-LIKE LIGHT FIXTURES.

BOLLARD

FIG. 4B

A SOLID <u>CYLINDRICAL</u> OBJECT OR <u>COLUMN</u> WITH ITS LENTH GREATER THAN ITS DIAMETER.

POLE

FIG. 4C

A RAISED SOURCE OF LIGHT ON THE EDGE OF A ROAD OR WALKWAY, USED TO PROVIDE LIGHT.

LAM<u>P</u>POST

FIG. 8

METHOD, HARD NEGATIVE PROPOSER, AND CLASSIFIER FOR SUPPORTING TO COLLECT HARD NEGATIVE IMAGES USING A SIMILARITY MAP

FIELD OF THE INVENTION

The present invention relates to a method, a hard negative proposer, and a classifier for supporting to collect hard negative images; and more particularly, to the method for (a) the hard negative proposer transmitting to the classifier at least one hard negative image candidate corresponding to a certain label candidate or a specific label candidate judged to have a semantic relationship or a visual relationship with a target object by referring to information on the target object to thereby allow the classifier to classify the hard negative image candidate and (b) the hard negative proposer selecting an additional label candidate whose similarity to the certain label candidate or the specific label candidate is determined to exceed a preset degree of similarity by referring to a similarity map including at least one piece of information on semantic similarity and visual similarity among multiple labels if a percentage or a number of the hard negative image candidate mistaken for having the target object is judged to satisfy a prefixed condition as the result of the classification of the hard negative image candidate by the classifier, and acquiring, and transmitting to the classifier, at least one additional hard negative image candidate corresponding to the selected additional label candidate, to thereby allow the classifier to classify the additional hard negative image candidate, and the hard negative proposer and the classifier using the same.

BACKGROUND OF THE INVENTION

Today, technologies for object detection or recognition which have been developed and embedded in a variety of electronic devices are used. For example, pedestrian detection technology for preventing risks of pedestrians by detecting the pedestrians is being put to use in a variety of electronic devices.

The object detection or recognition technology includes a process of learning (i.e., classifying) acquired images. The performance of a detector (i.e., classifier) depends on which types of features showing positions and intensity values of pixels of images to learn will be used and how many images will be used for learning. Recently, as image database where a lot of image data are accumulated has been built, a lot of image data enough to be used for learning have come to be obtained easily.

In general, a classifier may learn negative images which do not include a target object to detect or recognize. A detection system may repeat a bootstrapping process under which hard negative images, even as negative images, mistaken for including the target object are collected and re-learned.

If the bootstrapping process is repeated by using a lot of negative images, the operation quantity of the bootstrapping process, however, increases too much, resulting in too much time for whole learning. For effective learning by the classifier, it is necessary to select and learn only hard negative images mistaken for positive images, i.e., images including the target object, although the hard negative images do not include the target object.

SUMMARY OF THE INVENTION

It is an object of the present invention to solve all the problems mentioned above.

It is another object of the present invention to suggest technology for effectively collecting, or supporting to collect, hard negative images mistaken for positive images for effective learning.

It is still another object of the present invention to propose technology for effectively collecting, or supporting to collect, hard negative images corresponding to one or more certain labels by referring to a similarity map including information on at least either semantic similarity or visual similarity among multiple labels.

In accordance with one aspect of the present invention, there is provided a method for supporting to collect at least one hard negative image to increase object detection rates or object recognition rates, including the steps of: (a) a hard negative proposer transmitting to a classifier for classifying a target object at least one hard negative image candidate corresponding to a certain label candidate or a specific label candidate judged to have a semantic relationship or a visual relationship with the target object by referring to information on the target object to thereby allow the classifier to classify the hard negative image candidate; and (b) the hard negative proposer selecting an additional label candidate whose similarity to the certain label candidate or the specific label candidate is determined to exceed a preset degree of similarity by referring to a similarity map including information on at least either semantic or visual similarity among multiple labels, if a percentage or a number of the hard negative image candidate mistaken for having the target object is judged to satisfy a prefixed condition as the result of the classification of the hard negative image candidate by the classifier, and transmitting at least one additional hard negative image candidate corresponding to the selected additional label candidate to thereby allow the classifier to classify the additional hard negative image candidate.

In accordance with another aspect of the present invention, there is provided a method for supporting to collect at least one hard negative image to increase object detection rates or object recognition rates, including the steps of: (a) a classifier receiving from a hard negative proposer, and classifying, at least one hard negative image candidate corresponding to a certain label candidate or a specific label candidate judged to have a semantic relationship or a visual relationship with a target object by referring to information on the target object; and (b) the classifier (i) allowing the hard negative proposer to select an additional label candidate whose similarity to the certain label candidate or the specific label candidate is determined to exceed a preset degree of similarity by referring to a similarity map including information on at least either semantic or visual similarity among multiple labels, if a percentage or a number of the hard negative image candidate mistaken for having the target object is judged to satisfy a prefixed condition as the result of the classification of the hard negative image candidate, (ii) receiving at least one additional hard negative image candidate corresponding to the selected additional label candidate and (iii) classifying the additional hard negative image candidate.

In accordance with still another aspect of the present invention, there is provided a hard negative proposer for supporting to collect at least one hard negative image to increase object detection rates or object recognition rates, including: a negative image acquiring part for acquiring at least one hard negative image candidate corresponding to a certain label candidate or a specific label candidate judged to have a semantic relationship or a visual relationship with a target object by referring to information on the target object; a negative image proposing part for (i) transmitting the acquired hard negative image candidate to a classifier for classifying the target object, and (ii) selecting an additional label candidate whose similarity to the certain label candidate or the specific label candidate is determined to exceed a preset degree of similarity by referring to a similarity map including information on at least either semantic or visual similarity among multiple labels, if a percentage or a number of the hard negative image candidate mistaken for having the target object is judged to satisfy a prefixed condition as the result of the classification of the hard negative image candidate by the classifier, and transmitting at least one additional hard negative image candidate to the classifier by making the negative image acquiring part acquire the additional hard negative image candidate corresponding to the selected additional label candidate.

In accordance with still yet another aspect of the present invention, there is provided a classifier for supporting to collect at least one hard negative image to increase object detection rates or object recognition rates, including: a negative image acquiring part for acquiring from a hard negative proposer at least one hard negative image candidate corresponding to a certain label candidate or a specific label candidate judged to have a semantic or visual relationship with a target object by referring to information on the target object; and a hard negative image confirming part for (i) classifying the hard negative image candidate, and (ii) classifying at least one additional hard negative image candidate, after the at least one additional candidate negative image is received corresponding to an additional label candidate selected to have similarity to the certain label candidate or the specific label candidate is determined to exceed a preset degree of similarity by referring to a similarity map including information on at least either semantic or visual similarity among multiple labels if a percentage or a number of the received hard negative image candidate mistaken for having the target object is judged to satisfy a prefixed condition as the result of the classification of the hard negative image candidate.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
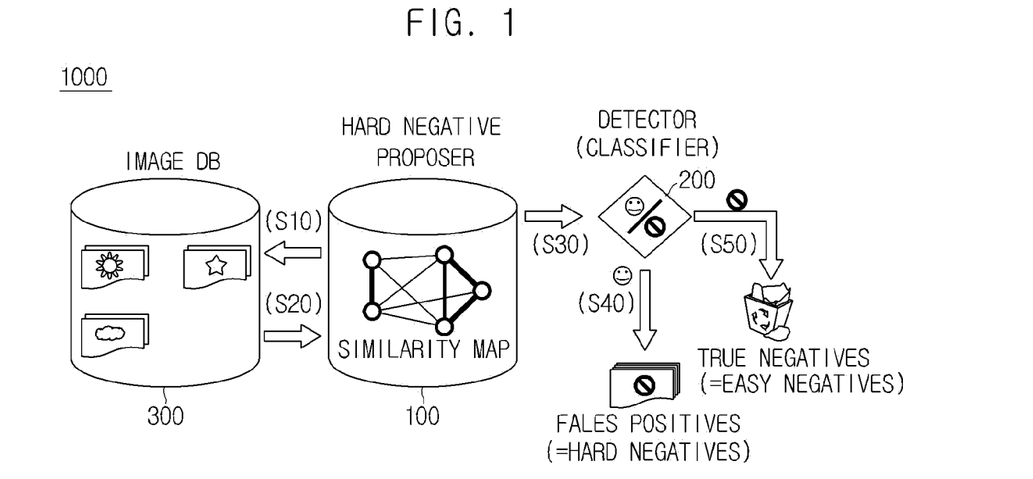
FIG. 1 is a drawing to explain a configuration of a system for supporting to collect hard negative images in accordance with one example embodiment of the present invention.

To allow those skilled in the art to the present invention to be carried out easily, the example embodiments of the present invention by referring to attached diagrams will be explained in detail as follows:

FIG. 1 is a drawing to explain a configuration of a system 1000 for supporting to collect hard negative images in accordance with one example embodiment of the present invention.

By referring to FIG. 1, the system 1000 for supporting to collect hard negative images in accordance with one example embodiment of the present invention may include a hard negative proposer 100, a classifier 200, image database 300, etc. As a modified example, the image database 300 could be located in the hard negative proposer 100.

The hard negative proposer 100 may acquire negative images corresponding to a certain label candidate from the image database 300 and propose at least some of them as hard negative image candidates (i.e., images which have high possibilities to be determined as hard negative images) to the classifier 200. In addition, if a percent or a number of hard negative image candidates mistaken for positive images by the classifier 200 is judged to satisfy a prefixed condition, the hard negative proposer 100 may select at least one additional label candidate whose similarity to the certain label candidate is determined to exceed the preset degree of similarity by referring to a similarity map including information on at least either semantic similarity or visual similarity among multiple labels and propose at least one of additional hard negative image candidates corresponding to the selected additional label candidate to the classifier 200. The more details will be explained later. Herein, a negative image means an image without a target object to detect or recognize while a positive image means an image with the target object. Besides, a hard negative image means a negative image which is, or has a high possibility to be, mistaken for a positive image by the classifier 200.

Figure 2A:
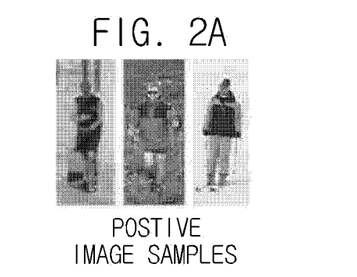
FIGS. 2A to 2C are drawings illustrating examples of positive, negative, and hard negative images, respectively.
Figure 2B:
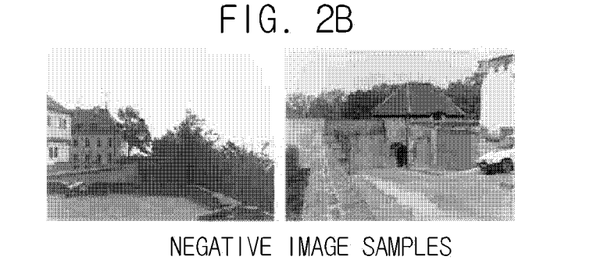
Figure 2C:
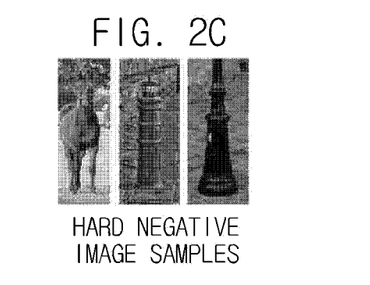

FIGS. 2A to 2C are drawings illustrating examples of positive, negative, and hard negative images, respectively.

FIG. 2A shows the examples of the positive images if the target object to detect is 'a person standing'. FIG. 2B illustrates the examples of the negative images without a person. FIG. 2C depicts the examples of the hard negative images which do not include a person but have high possibilities to be, mistaken for including the target object by the classifier.

The configuration and operation of the hard negative proposer 100 will be explained in more details below.

Figure 3:
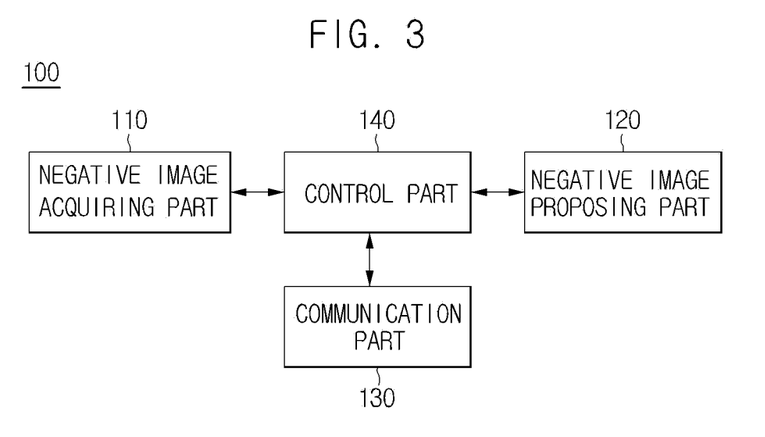
FIG. 3 is a block diagram of a hard negative proposer 100 in accordance with an example embodiment of the present invention.

FIG. 3 is a block diagram of the hard negative proposer 100 in accordance with an example embodiment of the present invention.

By referring to FIG. 3, the hard negative proposer 100 in accordance with one example embodiment of the present invention includes a negative image acquiring part 110, a negative image proposing part 120, a communication part 130, and a control part 140.

Herein, the hard negative proposer 100 in accordance with one example embodiment of the present invention may be any digital device, such as a personal computer (e.g., tablet PC, notebook, laptop, etc.), a PDA, a web pad, a mobile phone, a smart phone, etc. which have memory means and microprocessors with a calculation ability. Besides, an electronic calculator, which has a means of mass storage for large storage capacity such as public computer including a workstation, a network server, or a home automation system and has the calculation ability with at least one of processors, may be also adopted as the hard negative proposer 100 in accordance with one example embodiment of the present invention.

By referring to FIG. 3, the negative image acquiring part 110 may acquire negative images. Specifically, the negative image acquiring part 110 may acquire at least one hard negative image candidate corresponding to a certain label candidate or a specific label candidate judged to have a semantic relationship or a visual relationship with a target object by referring to information on the target object. In detail, the negative image acquiring part 110 may acquire the above-mentioned hard negative image candidate or an additional hard negative image candidate which will be explained later from the image database 300.

Herein, a label means a keyword tagged on an image, e.g., a keyword relating to an object included in the image. In addition, a label candidate means a label to be tagged on a hard negative image candidate having a high possibility to be judged as a hard negative image.

Moreover, "information on the target object" as mentioned above may include at least one piece of information on an image and a text with respect to the target object to be classified by the classifier 200. In addition, the information on the image and/or the text with respect to the target object may be provided to the hard negative proposer 100 from the classifier 200 and help the hard negative proposer 100 to select an appropriate label candidate.

Herein, if a label candidate includes a keyword same as, or similar to, the keyword included in the information on the text with respect to the target object, the label candidate may be judged to have semantic similarity to the target object and be recognized to have the semantic relationship with the target object. However, as another example, a label judged to be same as, or to have semantic sameness as, the target object may be excluded from a label candidate judged to have semantic relationship with the target object. It is because the label, which is same as or has sameness as the target object, itself has a very high possibility to indicate a positive image and, therefore, is not helpful in collecting hard negative images in accordance with the present invention. In the case, information on the label which is semantically same as, or has semantic sameness as, the target object may be stored in advance in the database.

If the similarity between the information on the image of the target object and the hard negative image candidate corresponding to the label candidate is acknowledged, the label candidate may be judged to have the visual relationship with the target object and recognized to have the visual relationship with the target object. However, as another example, a label judged to be same as, or visual sameness as, the information on the image of the target object may be excluded from the label candidate judged to have the visual relationship with the target object. It is because the label, which is same as or has sameness as the target object, itself has a very high possibility to indicate a positive image and, therefore, is not helpful in collecting hard negative images in accordance with the present invention. In the case, information on the label which is visually same as or has visual sameness as the target object may be stored in advance in the database.

In accordance with one example embodiment of the present invention, the visual similarity may be judged by referring to information on several types of features illustrating positions and intensity values of pixels included in the images but it is not limited to this. As another example embodiment of the present invention, the visual similarity may be judged as well by comparing feature points included in the image.

As illustrated in FIG. 1, the negative image acquiring part 110 may select a certain label candidate or a specific label candidate judged to have a semantic relationship or a visual relationship with a target object by referring to information on the target object and then transmit it as a query to the image database 300 at a step of S10. By referring to the received query, the image database 300 could provide the corresponding hard negative image candidate or information relating thereto to the negative image acquiring part 110 of the hard negative proposer 100 at a step of S20.

Again, by referring to FIG. 3, the negative image proposing part 120 may transmit the acquired hard negative image candidate to the classifier 200. In addition, the negative image proposing part 120 may determine an additional label candidate according to the result of the classification of the hard negative image candidate by the classifier 200 and transmit an additional hard negative image candidate corresponding thereto as well to the classifier 200. Specifically, as the result of the classification of the hard negative image candidate by the classifier 200, if a percent or a number of the hard negative image candidates mistaken for including the target object is judged to satisfy a prefixed condition (e.g., a condition under which the percent of being mistaken reaches 10% or more, or under which the number of being mistaken is 5 or more, etc.), the negative image proposing part 120 may select an additional label candidate whose similarity to the label candidate is determined to exceed the preset degree of similarity by referring to a similarity map including information on at least either semantic or visual similarity among multiple labels. As such, it would be also possible to transmit the selected additional label candidate as a query to the image database 300 and cause the image database 300 to provide the additional hard negative image candidate or information relating thereto to the negative image acquiring part 110 of the hard negative proposer 100 by referring to the received query.

Figure 4A:
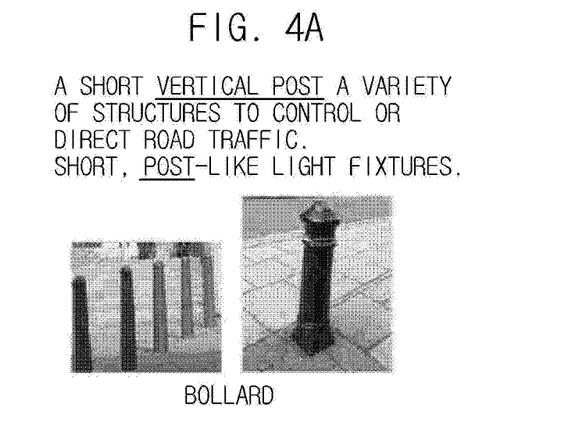
FIGS. 4A to 4C are drawings for explaining examples used to configure a similarity map.
Figure 4B:
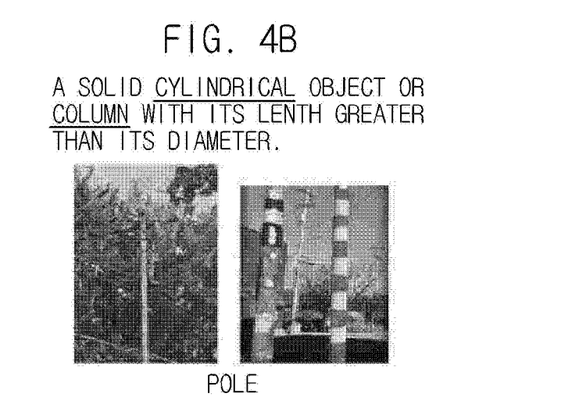
Figure 4C:
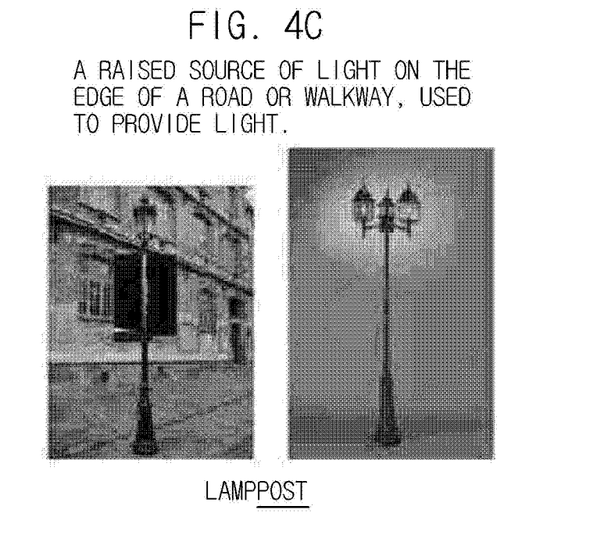

FIGS. 4A to 4C are drawings for explaining the examples used to configure a similarity map.

On assumption that labels are 'bollard' in FIG. 4A, 'pole' in FIG. 4B, and 'lamppost' in FIG. 4C, as explained in texts above the respective images of FIGS. 4A to 4C, the respective labels correspond to descriptions in text as provided in Wikipedia. A similarity map for managing degrees of similarity among labels acquired by judging degrees of similarity among such descriptions in text may be configured. To judge the degrees of similarity among the descriptions in text, an example of determining the degrees of similarity by selecting important words, etc. in the descriptions in text through the natural language processing, etc. and then by comparing the selected important words with thesaurus dictionary, etc. may be considered. Besides, it would be possible to configure the similarity map by judging degrees of visual similarity among respective images acquired from the image database 300, etc. or by judging both degrees of semantic similarity among the descriptions in text and the degrees of visual similarity.

Figure 5:
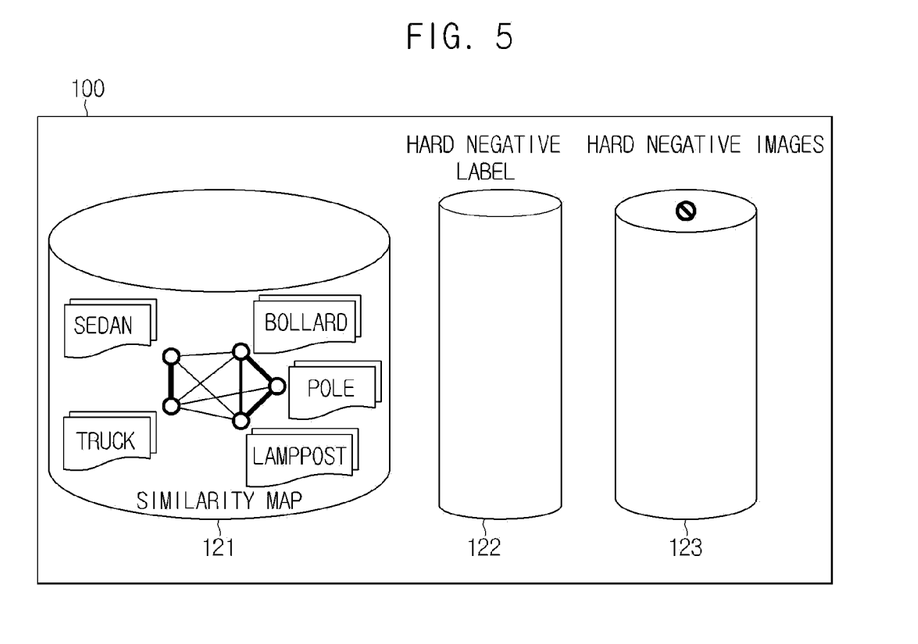
FIGS. 5 through 7 are drawings for explaining a process of collecting hard negative images in accordance with an example embodiment of the present invention.
Figure 6:
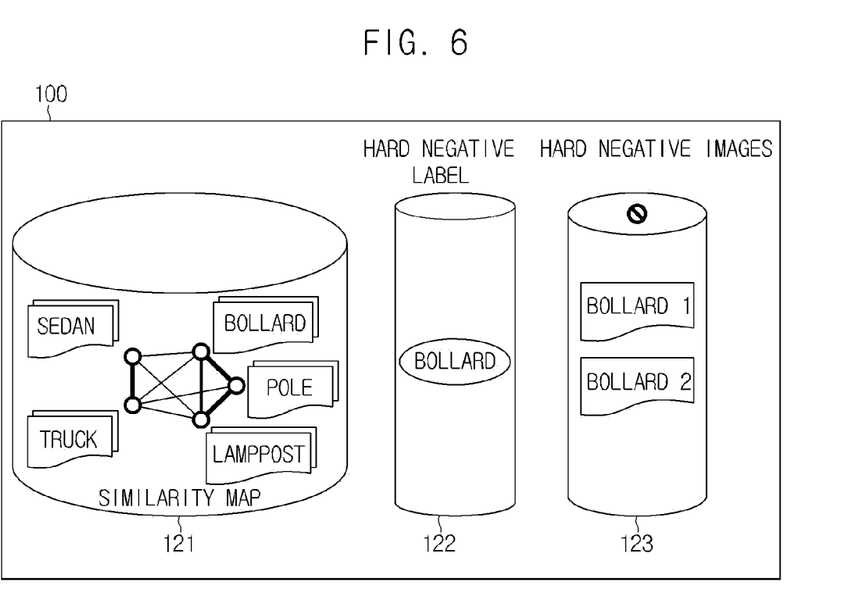
Figure 7:
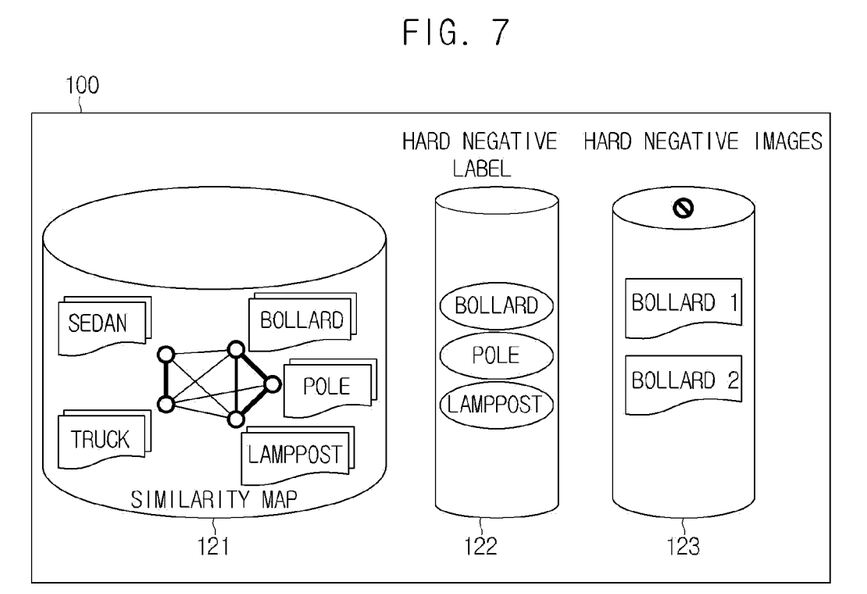

As a result of judging the degrees of semantic similarity and the degrees of visual similarity among multiple labels, the labels 'bollard' in FIG. 4A, 'pole' in FIG. 4B, and 'lamppost' in FIG. 4C are illustrated to have high degrees of similarity thereamong as examples as shown in FIGS. 5 to 7. In other words, b referring to the similarity map in FIGS. 5 to 7, the thickness of lines with which labels 'bollard', 'pole', and 'lamppost' are connected is displayed as bold and this is clearly made to mean the high degrees of similarity. Meanwhile, FIGS. 1, and 5 to 7 mention the examples where the hard negative proposer 100 includes the similarity map, but it could be also possible to introduce that the similarity map may be stored in a separate device.

By referring to FIG. 3 again, if the percentage or the number of hard negative image candidates corresponding to the label candidate mistaken for including the target object by the classifier 200 is judged to satisfy the prefixed condition, a hard negative image registering part (non-illustrated) may register, or support to register, the label candidate as a hard negative label and the hard negative image candidates as hard negative images. In this case, the hard negative image registering part could register, or support the classifier 200 or other devices to register, the hard negative image candidates as the hard negative images.

Furthermore, if the percentage or the number of the additional hard negative image candidates, corresponding to the additional label candidate, mistaken for including the target object by the classifier 200 is judged to satisfy the prefixed condition, the hard negative image registering part may register, or support to register, the additional label candidate as a hard negative label and the additional hard negative image candidates as hard negative images. In this case, the hard negative image registering part could register, or support the classifier 200 or other devices to register, the additional hard negative image candidates as the hard negative images.

By further referring to FIGS. 5 to 7, a detailed example embodiment of collecting the hard negative images will be explained below.

FIGS. 5 through 7 are drawings for explaining a process of collecting hard negative images in accordance with an example embodiment of the present invention.

As illustrated in FIG. 5, a hard negative label storing part 122 and a hard negative image storing part 123 may be empty at the early stage.

At this stage, the hard negative proposer 100 may acquire at least one of hard negative image candidates corresponding to a label candidate (e.g., 'Bollard') and then transmit it to the classifier 200 at a step of S30 as illustrated in FIG. 1.

The classifier 200 may classify the hard negative image candidate and, as a result of classification, two hard negative image candidates corresponding to the label 'Bollard' are classified as hard negative images by being mistaken for including the target object, as shown in FIG. 6, at a step of S40 in FIG. 1. Therefore, the label 'Bollard' is recorded in the hard negative label storing part 122 and two hard negative image candidates corresponding to the hard negative label are recorded in the hard negative image storing part 123.

Next, the hard negative proposer 100 may select an additional label candidate whose similarity to the label 'Bollard' stored in the hard negative label storing part is determined to exceed the preset degree of similarity by referring to the similarity map. As illustrated in FIG. 7, 'Pole' and 'Lamppost' which have high degrees of similarity to 'Bollard' are selected as additional label candidates, but 'Sedan' and 'Truck' which have low degrees of similarity to 'Bollard' could not be found to be selected as additional label candidates. For reference, it is illustrated in FIG. 7 that label candidates, e.g., 'Pole' and 'Lamppost' with high degrees of similarity to 'Bollard', are recorded immediately in the hard negative label storing part by referring to the similarity map, but it is not limited to this. Later, it would be also possible to make the label candidates, e.g., 'Pole' and 'Lamppost', recorded in the hard negative label storing part just after hard negative image candidates corresponding to the label candidates, e.g., 'Pole' and 'Lamppost', are judged as hard negative images by the classifier 200.

In accordance with another example embodiment of the present invention, which is not illustrated in drawings, the negative image proposing part 120 may include a hard negative image candidate proposing part (non-illustrated) and an additional hard negative image candidate proposing part (non-illustrated) as well.

The hard negative image candidate proposing part may transmit to the classifier 200 at least one of hard negative image candidates corresponding to a certain label candidate or a specific label candidate judged to have a semantic relationship or a visual relationship with the target object by referring to information on the target object and allow the classifier 200 to classify the hard negative image candidate. As a, result of the classification, if the percentage or the number of the hard negative image candidates being mistaken for including the target object is judged to satisfy the prefixed condition, the additional hard negative image candidate proposing part may select the additional label candidate whose similarity to the label candidate is determined to exceed the preset degree of similarity by referring to the similarity map, and transmit to the classifier 200 at least one additional hard negative image candidate corresponding to the selected additional label candidate to allow the classifier 200 to classify the additional hard negative image candidate.

Again, by referring to FIG. 3, the communication part 130 performs a function of allowing the hard negative proposer 100 to communicate with other external devices or support the communications between the negative image acquiring part 110 and the negative image proposing part 120.

The control part 140 performs a function of controlling data flow among the negative image acquiring part 110, the negative image proposing part 120, and the communication part 130. In other words, the control part 140 controls the flow of data from or to outside or among the components of the hard negative proposer 100 and thereby allows the negative image acquiring part 110, the negative image proposing part 120, and the communication part 130 to perform their unique functions.

Below will be the explanation on the configuration and operation of the classifier 200 in accordance with one example embodiment of the present invention.

Figure 8:
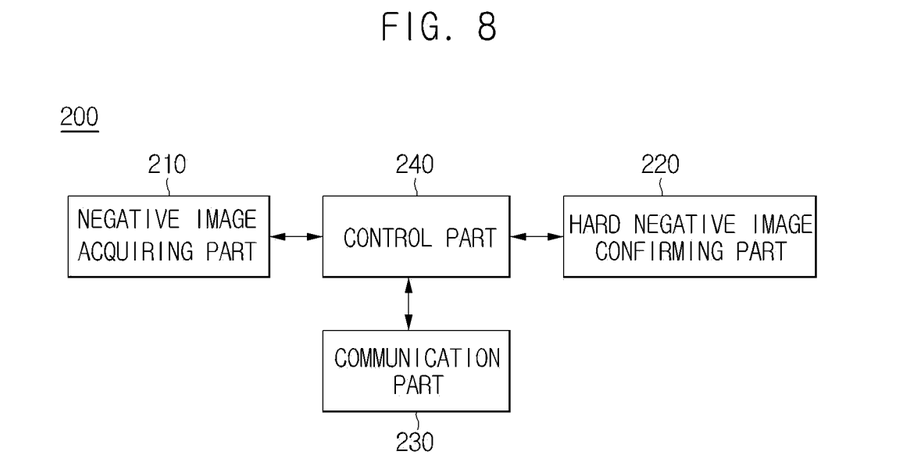
FIG. 8 is a block diagram illustrating a configuration of a classifier in accordance with an example embodiment of the present invention.

FIG. 8 is a block diagram illustrating a configuration of the classifier in accordance with an example embodiment of the present invention.

By referring to FIG. 8, the classifier 200 in accordance with one example embodiment of the present invention includes a negative image acquiring part 210, a hard negative image confirming part 220, a communication part 230, and a control part 240.

Herein, the classifier 200 in accordance with one example embodiment of the present invention is a digital device such as a personal computer (e.g., tablet PC, notebook, laptop, etc.), a PDA, a web pad, a mobile phone, a smart phone, etc. which have memory means and micro-processors with a calculation ability. Besides, an electronic calculator, which has a means of mass storage for large storage capacity such as public computer including a workstation, a network server, or a home automation system and has the calculation ability with at least one of processors, may be also adopted as the classifier 200 in accordance with one example embodiment of the present invention. Furthermore, the hard negative proposer 100 and the classifier 200 which are explained above could be implemented as one electronic device.

The negative image acquiring part 210 acquires at least one hard negative image candidate corresponding to a certain label candidate or a specific label candidate judged to have a semantic relationship or a visual relationship with the target object by referring to information on the target object from the hard negative proposer 100.

The hard negative image confirming part 220 may confirm the acquired hard negative image candidate as a hard negative image if, as the result of the classification by the classifier 200, the percentage or the number of the acquired hard negative image candidates mistaken for including the target object satisfies the prefixed condition. Besides, the hard negative image confirming part 220 may acquire the additional hard negative image candidate as explained above and also judge whether the additional hard negative image candidate corresponds to a hard negative image.

The communication part 230 performs a function of allowing the classifier 200 to communicate with other external devices or internal components.

The control part 240 performs a function of controlling data flow among the negative image acquiring part 210, the hard negative image confirming part 220, and the communication part 230. In other words, the control part 240 controls the flow of data from or to outside or among the components of the classifier 200 and thereby allows the negative image acquiring part 210, the hard negative image confirming part 220, and the communication part 230 to perform their unique functions.

Besides, a classifier 200 in accordance with another example embodiment of the present invention may further include the hard negative image registering part (non-illustrated).

If the percentage or the number of hard negative image candidates corresponding to the label candidate mistaken for including the target object is judged to satisfy the prefixed condition, the hard negative image registering part may directly register, or support other devices to register, the label candidate as a hard negative label and the hard negative image candidate as a hard negative image.

Besides, if the percentage or the number of the additional hard negative image candidates corresponding to the additional label candidate mistaken for including the target object is judged to satisfy the prefixed condition, the hard negative image registering part may directly register or support other devices to register, the additional label candidate as a hard negative label and the additional hard negative image candidate as a hard negative image.

At the time, the hard negative image confirming part 220 may learn by referring to images registered as the hard negative images.

In addition, the classifier 200 in accordance with one example embodiment of the present invention may further include a target object information providing part (non-illustrated). The target object information providing part may provide information on at least either an image or a text of the target object to be classified to the hard negative proposer 100 and allow the hard negative proposer 100 to select a label candidate judged to have semantic or visual similarity to the target object.

The present invention has an effect of effectively collecting, or supporting to collect, hard negative images to be used for effective learning.

In addition, the present invention has an effect of effectively collecting, or supporting to collect, negative images corresponding to similar labels by referring to the similarity map including information on at least either semantic or visual similarity among multiple labels.

The embodiments of the present invention may be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variation equal or equivalent to the patent claims pertain to the category of the thought of the present invention.

What is claimed is:

1. A method for supporting to collect at least one hard negative image to increase object detection rates or object recognition rates, comprising the steps of:
   (a) a hard negative proposer transmitting to a classifier for classifying a target object at least one hard negative image candidate corresponding to a certain label candidate or a specific label candidate judged to have a semantic relationship or a visual relationship with the target object by referring to information on the target object to thereby allow the classifier to classify the hard negative image candidate; and
   (b) the hard negative proposer selecting an additional label candidate whose similarity to the certain label candidate or the specific label candidate is determined to exceed a preset degree of similarity by referring to a similarity map including information on at least either semantic or visual similarity among multiple labels, if a percentage or a number of the hard negative image candidate mistaken for having the target object is judged to satisfy a prefixed condition as the result of the classification of the hard negative image candidate by the classifier, and transmitting at least one additional hard negative image candidate corresponding to the selected additional label candidate to thereby allow the classifier to classify the additional hard negative image candidate.

2. The method of claim 1, wherein, at the step (b), if the percentage or the number of the hard negative image candidate corresponding to the certain label candidate or the specific label candidate mistaken for having the target object is judged to satisfy the prefixed condition by the classifier, the hard negative proposer registers, or supports to register, the certain label candidate or the specific label candidate as a hard negative label and the hard negative image candidate as a hard negative image.

3. The method of claim 1, further comprising the step of: (c) the hard negative proposer registering, or supporting to register, the additional label candidate as a hard negative label and the additional hard negative image candidate as a hard negative image, if the percentage or the number of the additional hard negative image candidate corresponding to the additional label candidate mistaken for having the target object is judged to satisfy the prefixed condition by the classifier.

4. The method of claim 3, further comprising the step of: (d) the hard negative proposer allowing the classifier to learn by referring to at least one image registered as the hard negative image.

5. The method of claim 1, wherein, at the step (a), the hard negative proposer receives from the classifier information on at least either of an image or a text with respect to the target object as information on the target object and selects the specific label candidate judged to have semantic or visual similarity with the target object by referring to the information on at least either of the image or the text with respect to the target object.

6. The method of claim 1, wherein the hard negative proposer acquires the hard negative image candidate from a negative image pool.

7. The method of claim 1, wherein, at the step (a), a label judged to have semantic or visual sameness to the target object is excluded from the label candidate.

8. A method for supporting to collect at least one hard negative image to increase object detection rates or object recognition rates, comprising the steps of:
(a) a classifier receiving from a hard negative proposer, and classifying, at least one hard negative image candidate corresponding to a certain label candidate or a specific label candidate judged to have a semantic relationship or a visual relationship with a target object by referring to information on the target object; and
(b) the classifier (i) allowing the hard negative proposer to select an additional label candidate whose similarity to the certain label candidate or the specific label candidate is determined to exceed a preset degree of similarity by referring to a similarity map including information on at least either semantic or visual similarity among multiple labels, if a percentage or a number of the hard negative image candidate mistaken for having the target object is judged to satisfy a prefixed condition as the result of the classification of the hard negative image candidate, (ii) receiving at least one additional hard negative image candidate corresponding to the selected additional label candidate and (iii) classifying the additional hard negative image candidate.

9. The method of claim 8, wherein, at the step (b), if the percentage or the number of the hard negative image candidate corresponding to the certain label candidate or the specific label candidate mistaken for having the target object is judged to satisfy the prefixed condition, the classifier registers, or supports to register, the certain label candidate or the specific label candidate as a hard negative label and the hard negative image candidate as a hard negative image.

10. The method of claim 8, further comprising the step of: (c) the classifier registering, or supporting to register, the additional label candidate as a hard negative label and the additional hard negative image candidate as a hard negative image, if the percentage or the number of the additional hard negative image candidate corresponding to the additional label candidate mistaken for having the target object is judged to satisfy the prefixed condition.

11. The method of claim 10, further comprising the step of: (d) the classifier learning by referring to at least one image registered as the hard negative image.

12. The method of claim 8, wherein, at the step (a), the classifier provides information on at least either an image or a text with respect to the target object to be classified to the hard negative proposer and allows the hard negative proposer to select the specific label candidate judged to have semantic or visual similarity with the target object by referring to the information on at least either the image or the text with respect to the target object.

13. The method of claim 8, wherein the hard negative image candidate is acquired from a negative image pool.

14. The method of claim 8, wherein a label judged to have semantic or visual sameness to the target object is excluded from the label candidate.

15. A hard negative proposer for supporting to collect at least one hard negative image to increase object detection rates or object recognition rates, comprising:
a negative image acquiring part for acquiring at least one hard negative image candidate corresponding to a certain label candidate or a specific label candidate judged to have a semantic relationship or a visual relationship with a target object by referring to information on the target object;
a negative image proposing part for (i) transmitting the acquired hard negative image candidate to a classifier for classifying the target object, and (ii) selecting an additional label candidate whose similarity to the certain label candidate or the specific label candidate is determined to exceed a preset degree of similarity by referring to a similarity map including information on at least either semantic or visual similarity among multiple labels, if a percentage or a number of the hard negative image candidate mistaken for having the target object is judged to satisfy a prefixed condition as the result of the classification of the hard negative image candidate by the classifier, and transmitting at least one additional hard negative image candidate to the classifier by making the negative image acquiring part acquire the additional hard negative image candidate corresponding to the selected additional label candidate.

16. The method of claim 15, wherein the negative image proposing part includes: a hard negative image candidate proposing part for supporting the classifier to classify the hard negative image candidate by transmitting to the classifier at least one hard negative image candidate corresponding to the certain label candidate or the specific label candidate judged to have a semantic relationship or a visual relationship with a target object by referring to information on the target object; and an additional hard negative image candidate proposing part for supporting the classifier to classify the additional hard negative image candidate by selecting the additional label candidate whose similarity to the certain label candidate or the specific label candidate is determined to exceed the preset degree of similarity by referring to the similarity map if the percentage or the number of the hard negative image candidate mistaken for having the target object is judged to satisfy the prefixed condition as the result of the classification and then by transmitting the at least one additional hard negative image candidate corresponding to the selected additional label candidate.

17. The method of claim 15, further comprising: a hard negative image registering part for registering, or supporting to register, the label candidate as a hard negative label and the hard negative image candidate as a hard negative image, if the percentage or the number of the hard negative image candidate corresponding to the label candidate mistaken for having the target object is judged to satisfy the prefixed condition by the classifier.

18. The hard negative proposer of claim 15, further comprising: a hard negative image registering part for registering, or supporting to register, the additional label candidate as a hard negative label and the additional hard negative image candidate as a hard negative image, if the percentage or the number of the additional hard negative image candidate corresponding to the additional label candidate mistaken for having the target object is judged to satisfy the prefixed condition by the classifier.

19. The hard negative proposer of claim 15, wherein the negative image acquiring part receives from the classifier information on at least either an image or a text with respect to the target object to be classified by the classifier as information on the target object and selects the label candidate judged to have semantic or visual similarity with the target object by referring to the information on at least either the image or the text with respect to the target object.

20. The hard negative proposer of claim 15, wherein the negative image acquiring part acquires the hard negative image candidate from a negative image pool.

21. The hard negative proposer of claim 15, wherein a label judged to have semantic or visual sameness to the target object is excluded from the label candidate.

22. A classifier for supporting to collect at least one hard negative image to increase object detection rates or object recognition rates, comprising:
 a negative image acquiring part for acquiring from a hard negative proposer at least one hard negative image candidate corresponding to a certain label candidate or a specific label candidate judged to have a semantic or visual relationship with a target object by referring to information on the target object; and
 a hard negative image confirming part for (i) classifying the hard negative image candidate, and (ii) classifying at least one additional hard negative image candidate, after the at least one additional candidate negative image is received corresponding to an additional label candidate selected to have similarity to the certain label candidate or the specific label candidate is determined to exceed a preset degree of similarity by referring to a similarity map including information on at least either semantic or visual similarity among multiple labels if a percentage or a number of the received hard negative image candidate mistaken for having the target object is judged to satisfy a prefixed condition as the result of the classification of the hard negative image candidate.

23. The classifier of claim 22, further comprising: a hard negative image registering part for registering, or supporting to register, the certain label candidate or the specific label candidate as a hard negative label and the hard negative image candidate as a hard negative image, if the percentage or the number of the hard negative image candidate corresponding to the certain label candidate or the specific label candidate mistaken for having the target object is judged to satisfy the prefixed condition.

24. The classifier of claim 22, further comprising: a hard negative image registering part for registering, or supporting to register, the additional label candidate as a hard negative label and the additional hard negative image candidate as a hard negative image, if the percentage or the number of the additional hard negative image candidate corresponding to the additional label candidate mistaken for having the target object is judged to satisfy the prefixed condition.

25. The classifier of claim 24, wherein the hard negative image confirming part learns by referring to at least one image registered as the hard negative image.

26. The classifier of claim 22, further comprising: a target object information providing part for providing information on at least either an image or a text with respect to the target object to classify to the hard negative proposer and allowing the hard negative proposer to select the specific label candidate judged to have semantic or visual similarity with the target object by referring to the information on at least either the image or the text with respect to the target object.

27. The classifier of claim 22, wherein the hard negative image candidate is acquired from a negative image pool.

28. The classifier of claim 22, wherein a label judged to have sameness to the target object is excluded from the label candidate.

* * * * *